UNITED STATES PATENT OFFICE.

CHARLES A. CATLIN, OF PROVIDENCE, RHODE ISLAND, ASSIGNOR TO THE RUMFORD CHEMICAL WORKS, OF SAME PLACE.

BAKING POWDER OR PREPARATION.

SPECIFICATION forming part of Letters Patent No. 439,267, dated October 28, 1890.

Application filed June 5, 1890. Serial No. 354,375. (No specimens.)

*To all whom it may concern:*

Be it known that I, CHARLES A. CATLIN, of Providence, Rhode Island, have invented a new and useful Improvement in Baking-Powders, which improvement is fully set forth in the following specification.

This invention has reference to the preparation known as "baking-powders," in which the active constituents are a dry acid or acid salt and a carbonate or their equivalents, between which reaction takes place in the operation of mixing dough, resulting in the liberation of carbonic-acid gas, as well understood.

It is customary in the preparation of baking-powders to introduce a certain proportion of an inert substance, as starch, flour, or other dry powder. The chief utility of this inert substance is that of a separator of the active ingredients, to prevent reaction between them under the influence of ordinary atmospheric humidity, and it also serves as a diluent to reduce the strength of the baking-powder to the commercial standard. Corn-starch is the substance commonly used for this purpose, and may be taken as the typical diluent in considering the changes that occur in baking-powders under the conditions to which they are ordinarily exposed.

It is a well-known fact that baking-powders deteriorate or suffer loss of strength to a greater or less degree, and while this does not take place to an appreciable extent so long as the powder is in a tightly-closed package which properly excludes the atmosphere, the deterioration advances more or less rapidly when the powder is exposed. It is of course desirable for the sake of economy to obviate the necessity of using such packages. The loss of strength or capacity is the consequence of a premature reaction between the acid and carbonate and the liberation of the carbonic-acid gas, which is designed to be released in the dough itself, and the obvious conclusion is that the character of the diluent or separator has much to do with the permanence of the baking-powder.

Corn-starch in its ordinary commercial condition contains from twelve to fourteen per cent. of moisture, and when dried and afterward exposed to the atmosphere it will reabsorb this normal amount. It has, moreover, the property of readily parting with its moisture to deliquescent bodies, and when in admixture with deliquescent salts exposed to air it acts as a sponge, absorbing the moisture from the air and parting with it to the salt, with which it is mixed. Thus under conditions of ordinary occurrence the utility of the starch as a separator or protector is impaired and it virtually becomes a conductor of moisture to the salts in admixture with it, with the result above pointed out.

The attempt has been made to prevent the detrimental action following exposure to humidity by adding to the mixture in one way or another an oleaginous or fatty material, as lard, stearine, tallow, or paraffine. The results of such attempts have been disappointing. Where solid fats are employed in quantity sufficient to constitute an efficient protection, the bread prepared therewith is spotted from the local action of the acid and soda particles. Moreover, "caking" is likely to result when powders so prepared are exposed to ordinary maximum temperature and then cooled. Other objectionable effects have been noted, upon which, however, it is not deemed necessary to enlarge.

The object of the present invention is to prevent the deterioration which occurs when baking-powders as ordinarily prepared are exposed to varying atmospheric conditions and to produce a permanent or stable mixture by substituting for the starch wholly or in part a material which while efficient as a separator, and whose presence in a food product is entirely unobjectionable, does not act like starch in absorbing moisture and parting with it to the active constituents of the powder. This result, as I have discovered, can be accomplished by the use of a salt of a fatty acid, such as a stearate.

As an example of one mode of carrying the invention into effect, I will describe the procedure followed with stearate of calcium, with which the objects of the invention have been realized, by proceeding as follows:

Fifty-six parts of lime are slaked and made up into a thin milk with, say, two thousand parts of water, and into it is stirred five hundred and sixty-eight parts of commercial stearic acid, reduced to a coarse powder by grating. These substances, after being thoroughly commingled by stirring while cold, are brought to a rapid boil, and there maintained until neither the mass nor the liquid will give an alkaline reaction with litmus-paper. The granular product that separates from the liquid on cooling a little is taken out, drained, and dried. In this condition it forms a soft flocculent mass, which can be readily reduced to a fine powdered state and added to the acid and carbonate of the baking-powder. In introducing it into the baking-powder I preferably mix a portion of the powdered stearate and the acid by themselves, then a portion of the powdered stearate and the carbonate by themselves, and afterward bring the two mixtures together with or without a further addition of diluent, as the case may be. The process of mixing pursued may be either that of stirring and sifting, milling or grinding, or any other by which experience teaches the best results are obtained.

The combination of the salt of a fat acid with a carbonate and also with an acid may be of value as separate articles of commerce for other purposes than ingredients of a baking-powder. The bicarbonate of soda of commerce and various dry acids are largely sold separately for use by families and others. The soda and some of the acids often become lumpy or caked by the absorption of moisture from the air, which impairs their usefulness unless they are finely crushed before using. It is inconvenient and sometimes impracticable for the consumer to reduce such material to the required degree of fineness so as to obtain the best results in their use. The combination of a salt of a fatty acid with the soda and acid will prevent in a marked degree the absorption of atmospheric moisture, and thereby preserve the material in a finely-powdered condition.

It will of course be understood that the mode of procedure given above may be modified in many ways without departing from the spirit of the invention, which is by no means limited to the use of stearate of calcium, and that the use in a baking powder or preparation of a salt or combination of a fat acid with an inorganic base is within the invention.

The term "salt or combination of a fat acid with an inorganic base" is used herein to designate only the higher members of the fatty acid group—namely, those derived from fats themselves—and to distinguish the class of salts used from tartaric, citric, and lactic acids, which are not in the strict sense "fatty acids," though they are commonly assigned to this group by virtue of an assumed molecular structure, and are not included in the invention.

It is further to be understood that while I contemplate using the new diluent in place of the starch or other diluents commonly employed, a useful result and one within the invention may be obtained by replacing a portion only of the starch with the stearate or other fatty acid salt or compound.

I claim as my invention—

1. A baking powder or preparation containing as an ingredient a salt or combination of a fat acid with an inorganic base, substantially as described.

2. A baking powder or preparation containing active constituents, such as an acid and a carbonate, combined with a salt or combination of a fat acid with an inorganic base, substantially as described.

3. A baking powder or preparation containing as a diluent the stearate of an alkaline earth, such as stearate of calcium, substantially as described.

In testimony whereof I have signed this specification in the presence of two subscribing witnesses.

CHARLES A. CATLIN.

Witnesses:
CHARLES S. MACNAIR,
STEPHEN ESSEX.